US006972666B2

(12) United States Patent
Chen

(10) Patent No.: US 6,972,666 B2
(45) Date of Patent: Dec. 6, 2005

(54) WIRELESS ANTI-THEFT DEVICE

(75) Inventor: Tse-Hsing Chen, Taipei Shien (TW)

(73) Assignee: Shu-Chen Lu, Taipei Shien (TW)

( * ) Notice: Subject to any disclaimer, the term of this patent is extended or adjusted under 35 U.S.C. 154(b) by 143 days.

(21) Appl. No.: 10/748,261

(22) Filed: Dec. 31, 2003

(65) Prior Publication Data

US 2005/0151627 A1 Jul. 14, 2005

(51) Int. Cl.[7] .............................................. B60R 25/10
(52) U.S. Cl. ............................ 340/426.16; 340/426.1; 340/825.69; 307/10.2
(58) Field of Search ............................ 340/5.61, 5.64, 340/5.65, 825.36, 825.69, 825.72, 426.1, 340/426.13, 426.16, 426.18, 426.22; 307/10.2

(56) References Cited

U.S. PATENT DOCUMENTS 5,469,151 A * 11/1995 Lavelle et al. ......... 340/825.36
5,543,778 A * 8/1996 Stouffer ................. 340/539.14
5,963,128 A * 10/1999 McClelland ................ 340/447
6,107,914 A * 8/2000 Greene .................. 340/426.25
6,535,116 B1 * 3/2003 Zhou .......................... 340/447
6,781,519 B1 * 8/2004 Diaz ..................... 340/825.72

* cited by examiner

*Primary Examiner*—Brent A. Swarthout

(74) *Attorney, Agent, or Firm*—Troxell Law Office, PLLC

(57) ABSTRACT

A wireless anti-theft device mainly includes a host having a power-supply voltage-stabilizing circuit, an anti-theft coding and CPU circuit, a host control circuit, an emitting circuit, a host receiving circuit, and an I/O socket; and a wireless siren being internally provided with a power-supply voltage-stabilizing circuit, an RF wireless receiving circuit, a decoding and CPU circuit, and an anti-theft voicing and driving circuit. The anti-theft coding and CPU circuit generates Manchester anti-theft code having a Hi-Low ratio of 1:1, so that the wireless siren could quickly and accurately analyze received data code to emit precise warning sound.

2 Claims, 6 Drawing Sheets

WIRELESS ANTI-THEFT DEVICE

FIELD OF THE INVENTION

The present invention relates to a wireless anti-theft device, and more particularly to a wireless anti-theft device that uses Manchester code having a Hi-Low ratio of 1:1 to transmit data code, so that a wireless siren controlled by a host of the device is able to quickly and accurately analyze the received data code to emit precise warning sound without interfering with or being interfered by other similar devices.

BACKGROUND OF THE INVENTION

Most currently commercially available car anti-theft devices may be divided into two types according to the manner of installation thereof. The first type includes a host that is mounted in a car. In this case, an output wire for an anti-theft speaker of the device is extended from an interior of the car through a steel fire wall into an engine chamber of the car. The second type includes a host that is mounted in the engine chamber of a car. In this second case, door open/close wires and other in-car detection wires of the car are extended from the engine chamber through the fire wall into the car.

In both of the above two installation manners, it is necessary to extend wires of the anti-theft device and other initially provided wires of the car through the fire wall. To prevent exhaust and wastewater from flowing into the car via wire mounting holes on the fire wall, most car manufacturers would seal these holes after the wiring of the car is completed, or purposefully provide an S-shaped fire wall, resulting in high difficulties in extending the wires of the anti-theft device through the fire wall and increased installation time and labor. And, it would inevitably spoil or damage the original airtight and watertight ability of the fire wall as well as the wires originally provided with the car, if the wires of the anti-theft device are forced through the fire wall.

Generally, the fire wall may be extended through by way of connecting copper cord along the engine, directly drilling holes on the fire wall, etc. All these ways of extending through the fire wall will result in incomplete airtight and watertight ability of the fire wall, and increased installation time and labor. Particularly, most newly designed cars in the market have a double-layer fire wall that further increases the difficulty in wiring the anti-theft device. Even if the drilled holes on the fire wall may be sealed again, they would adversely affect an overall appearance of the car body. And, most car buyers would not accept such defects on a new car.

To solve the problem of extending wires through the fire wall, wireless anti-theft devices have been developed. However, the currently available wireless anti-theft devices typically include a host mounted in the car, and the host loads all numbered signals on a 12V wire of the car, so that the wiring initially provided on the car is utilized to transmit coded signals to a battery in the engine chamber. And, a decoder and sound control means are additionally provided on an anti-theft speaker. However, to distinguish the coded signals of the anti-theft device from noises on the wiring of the car, a relatively complicate circuitry for data analysis and data control must be provided, which results in largely increased cost to lower the consumers' interest in buying the car.

FIG. 1 shows a conventional encoding and decoding IC currently available in the market. As can be seen from FIG. 1, the encoding and decoding IC uses a data transmission form with a Hi-Low ratio thereof being 1:3 or 3:1, both of which are non-equal ratios, and a relatively long interval, usually longer than 50 ms, between two sets of data codes. The long interval together with various kinds of signals in the air makes the transmission of data code in the form of non-equal Hi-Low ratio subjected to problematic representation of different functions, such as setting anti-theft state, releasing anti-theft state, door not closed, anti-theft function has been activated, etc. For example, the anti-theft device might emit one or one and a half short sounds while it was set to emit two short sounds of, for example, 50 ms each, at an interval of 50 to 100 ms. Or, the anti-theft device might emit only two or two and a half short sounds while it was set to emit three short sounds. That is, the conventional wireless anti-theft device has the problem of indicating incorrect functions.

It is therefore tried by the inventor to develop an improved wireless anti-theft device to eliminate the problems existed in the conventional products for the same purpose.

SUMMARY OF THE INVENTION

A primary object of the present invention is to provide a wireless anti-theft device that does not damage the car body structure when being installed on a car, permits largely reduced circuitry design cost, and enables a wireless siren controlled by a host of the device to quickly analyze data code received from the host without interfering with or being interfered by other similar devices to ensure quick and accurate operation of the wireless anti-theft device.

To achieve the above and other objects of the present invention, the wireless anti-theft device of the present invention mainly includes a host having a power-supply voltage-stabilizing circuit, an anti-theft coding and CPU circuit, a host control circuit, an emitting circuit, a host receiving circuit, and an I/O socket; and a wireless siren being internally provided with a power-supply voltage-stabilizing circuit, an RF wireless receiving circuit, a decoding and CPU circuit, and an anti-theft voicing and driving circuit. The anti-theft coding and CPU circuit generates Manchester anti-theft code, a Hi-Low ratio of which is 1:1, so that the wireless siren could quickly and accurately analyze any received data code to emit precise warning sound.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1 schematically shows the manner of data transmission by a conventional encoding IC.

DETAILED DESCRIPTION OF THE PREFERRED EMBODIMENTS

Figure 1:
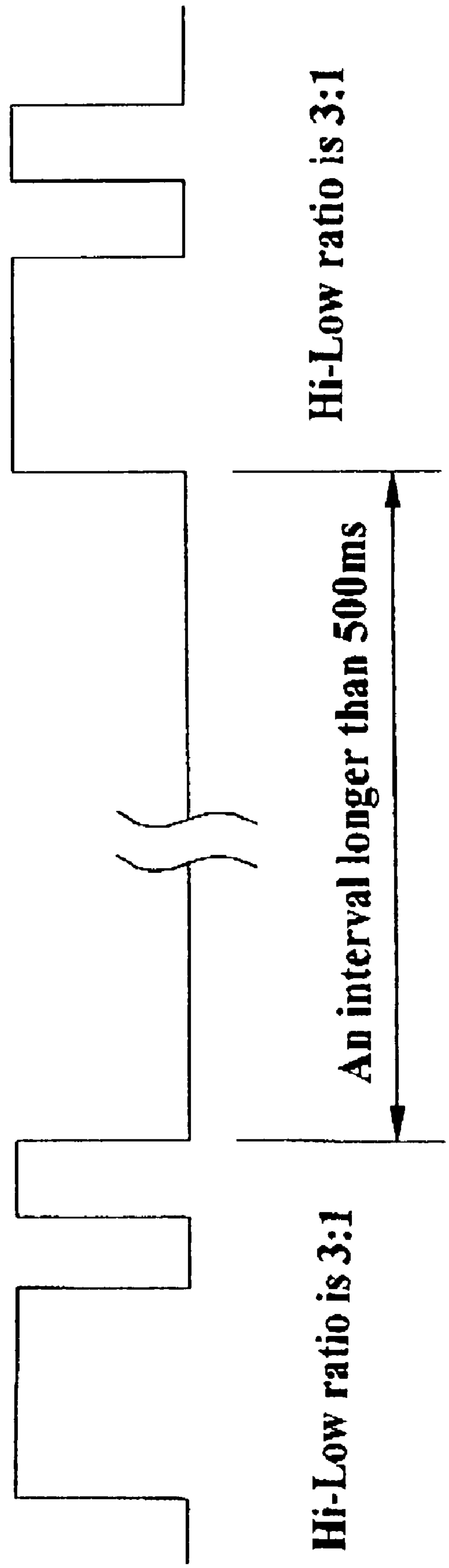
Figure 2:
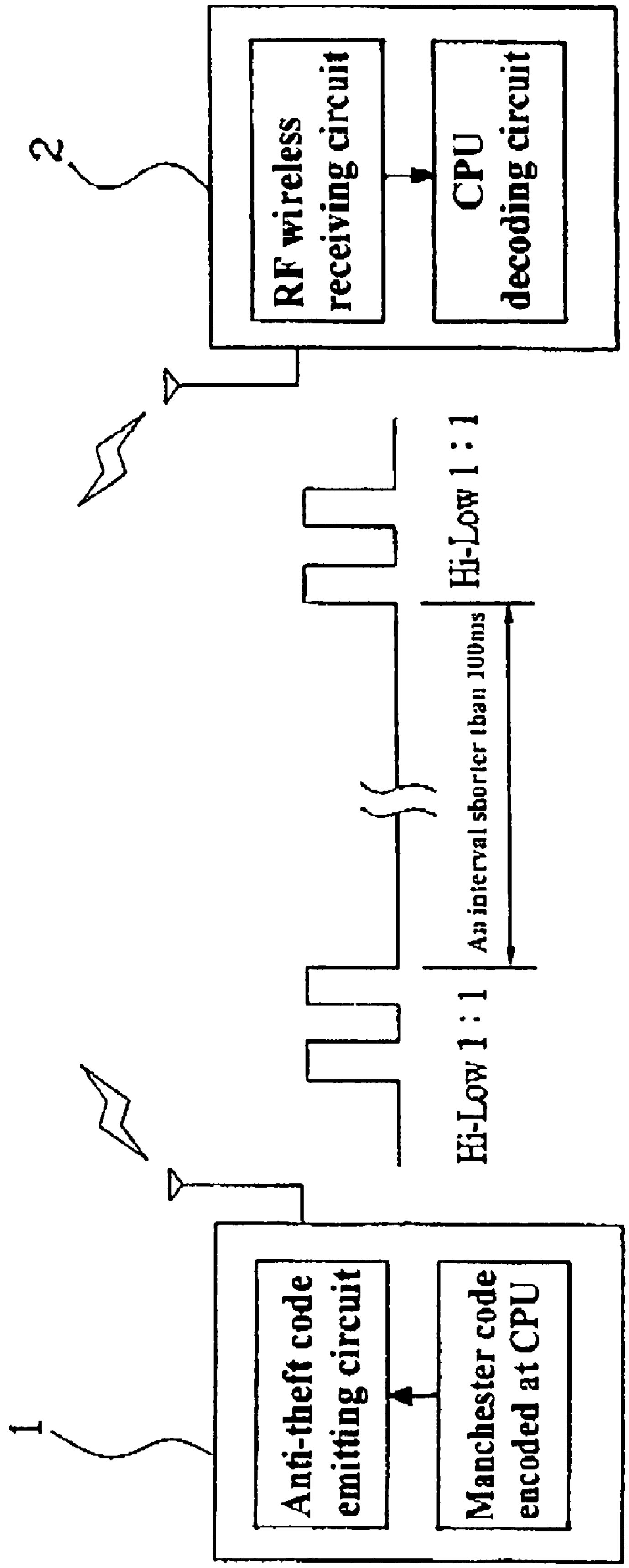
FIG. 2 schematically shows the operating manner of a wireless anti-theft device according to the present invention.
Figure 3:
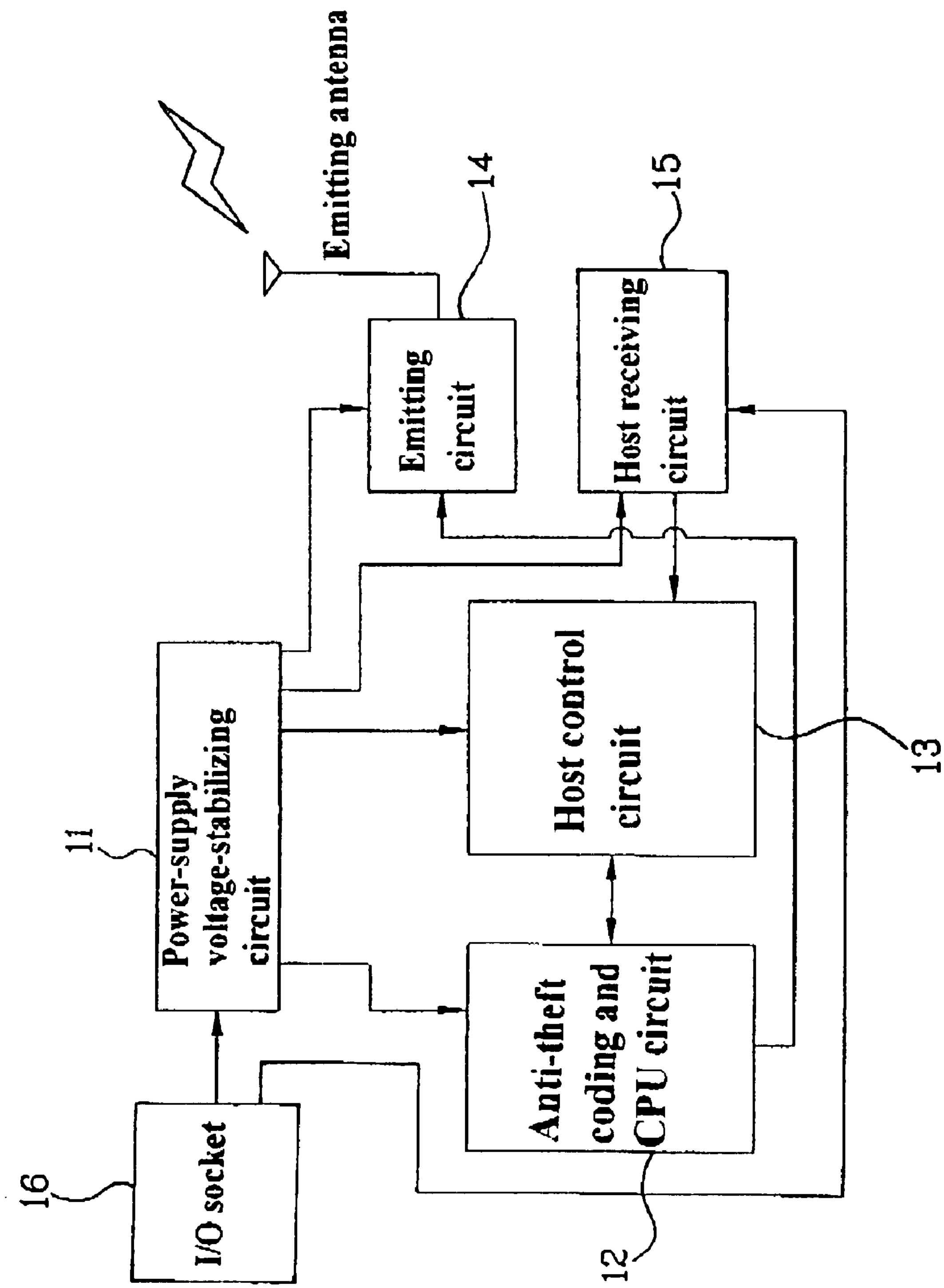
FIG. 3 is a block diagram of a host of the wireless anti-theft device of the present invention.
Figure 4:
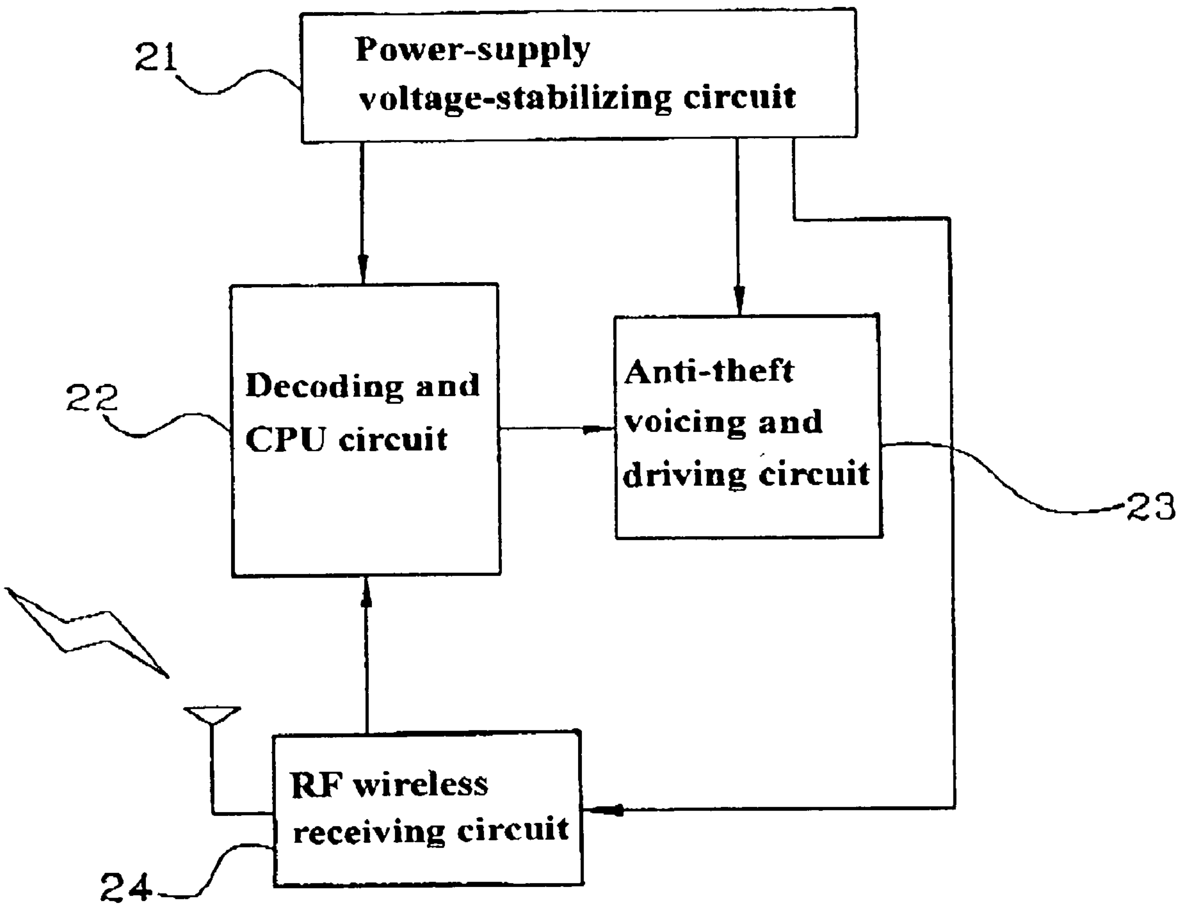
FIG. 4 is a block diagram of a wireless siren of the wireless anti-theft device of the present invention.

Please refer to FIGS. 2 to 4, in which a wireless anti-theft device according to the present invention is shown. The wireless anti-theft device of the present invention mainly includes a host 1 and a wireless siren 2.

The host 1 includes a power-supply voltage-stabilizing circuit 11 for supplying power to different components of the host 1, an anti-theft coding and CPU circuit 12 for generating a Manchester anti-theft code having a Hi-Low ratio of 1:1, a host control circuit 13 for controlling the operation of different components of the host, an emitting circuit 14 for emitting an anti-theft signal, a host receiving circuit 15 for receiving a remote controlling signal, and an input/output (I/O) socket 16 for electrically connecting to a power receptacle on a car.

The wireless siren 2 is internally provided with a power-supply voltage-stabilizing circuit 21 for supplying power to different components of the wireless siren 2, an RF wireless receiving circuit 24 for receiving an RF anti-theft signal from the host 1, a decoding and CPU circuit 22 for decoding and comparing the received anti-theft signal; and an anti-theft voicing and driving circuit 23 for generating warning sound and anti-theft control.

To overcome the problems existed in the data transmission by the above-mentioned conventional encoding and decoding IC using a Hi-Low ratio of 1:3 or 3:1, the present invention sets the data code to the Manchester code having a Hi-Low ratio of 1:1, and an interval between two sets of data codes is shorter than 100 ms, as shown in FIG. 2, so that the wireless siren 2 controlled by the host 1 is able to accurately analyze the anti-theft signal within a very short time and thereby emits correct warning sound.

Figure 5:
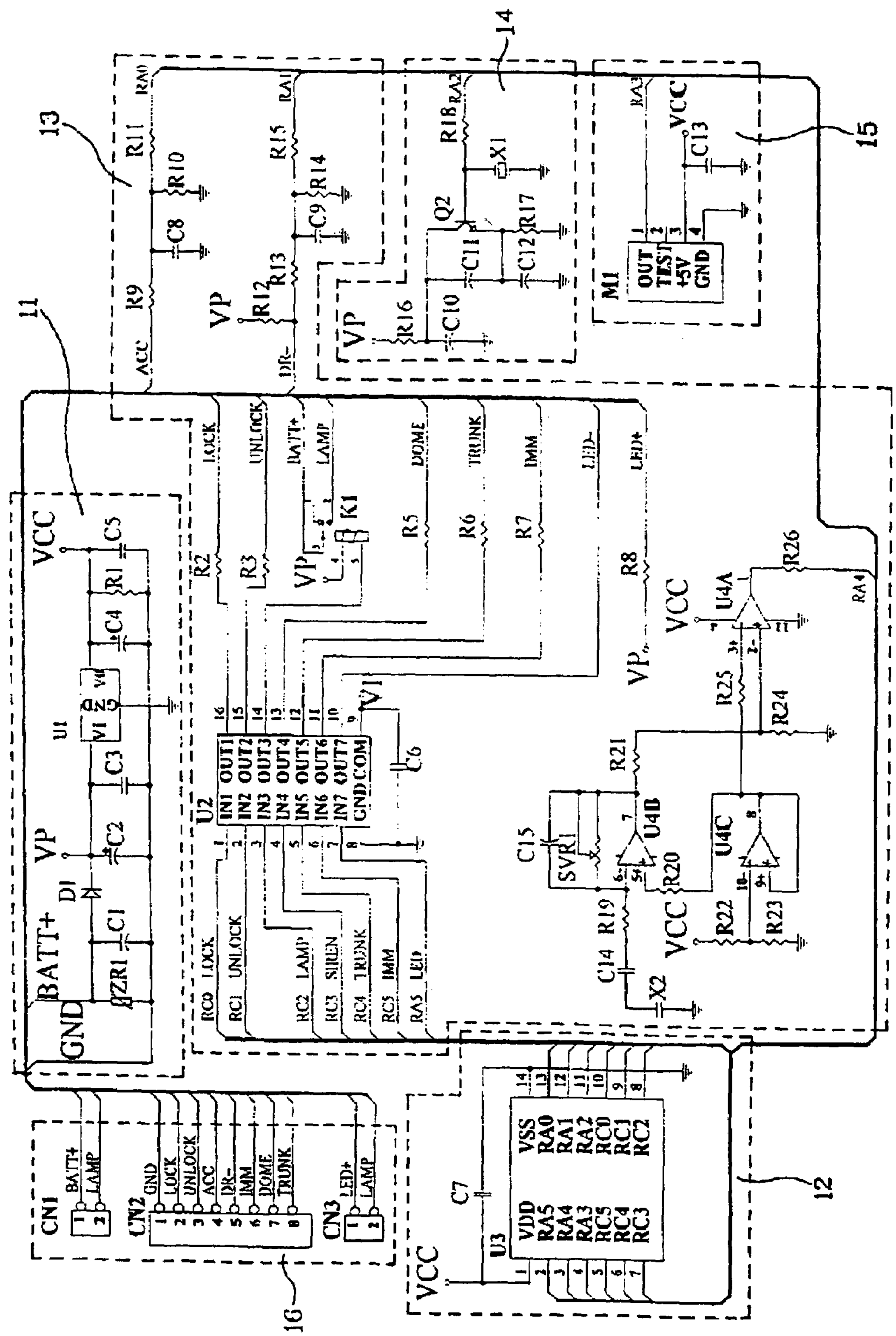
FIG. 5 is a circuit diagram for the host of the wireless anti-theft device of the present invention.

FIG. 5 is a circuit diagram for the host of the wireless anti-theft device of the present invention. As shown, the anti-theft coding and CPU circuit 12 couples and protects codes via R18; and X1SAW, which serves as an oscillation amplitude of an emitting frequency, is amplified by Q2; oscillations C11/C12/C10 are emitted from an antenna via R16; and R17 is a bias voltage of Q2.

Figure 6:
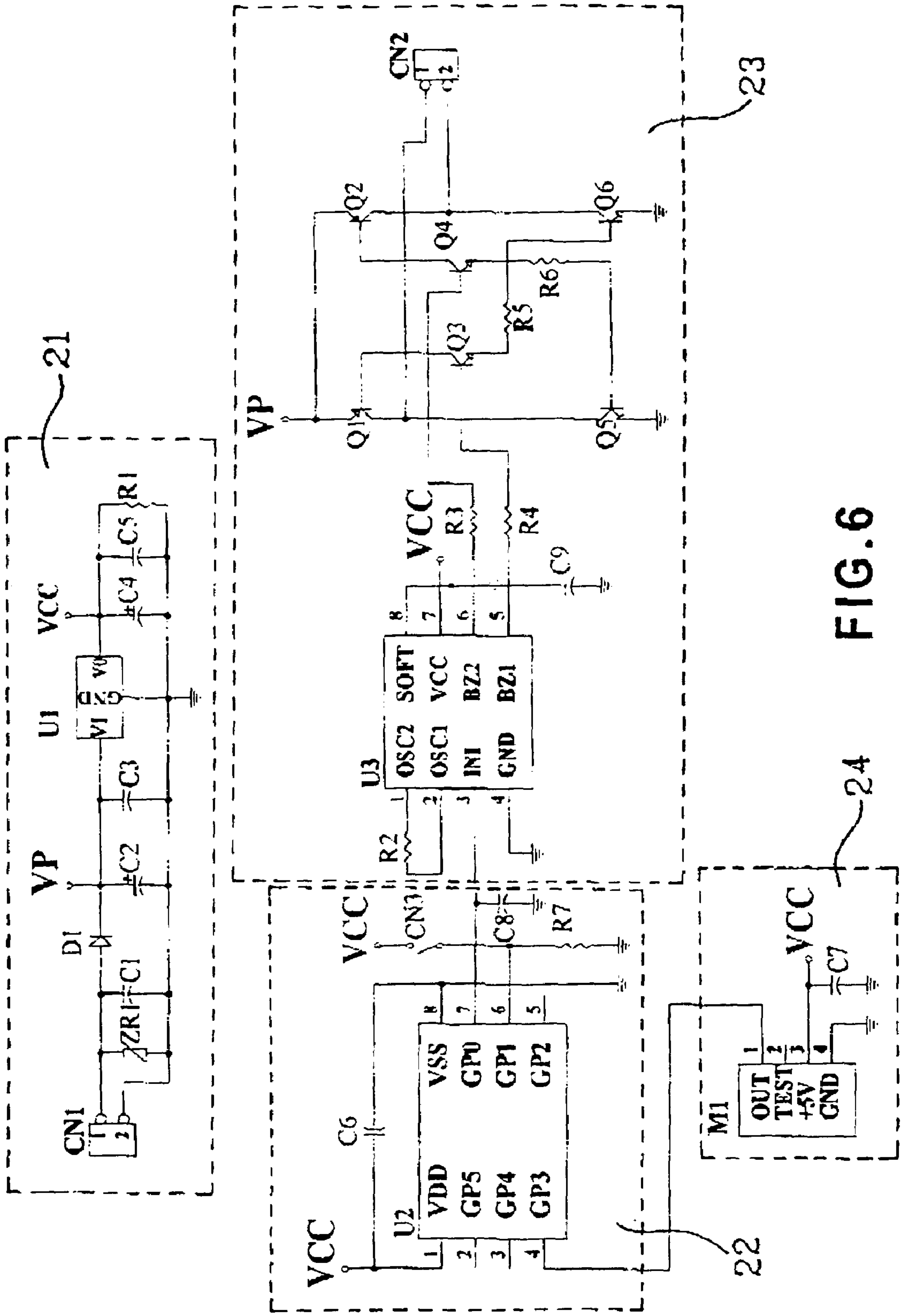
FIG. 6 is a circuit diagram for the wireless siren of the present invention.

FIG. 6 is a circuit diagram for the wireless siren 2 of the present invention. As shown, U2 is the decoding and CPU circuit 22, U3 is a voice IC, which together with Q1, Q2, Q3, Q4, Q5, Q6, and other peripheral circuits forms the anti-theft voicing and driving circuit 23 for driving the wireless siren 2 to emit sound depending on the decoded data code.

With the above arrangements, as shown in FIGS. 2 to 6, an existing CPU of the host 1 is used to encoding the Manchester code. Therefore, the conventional coding circuit is omitted to save the circuit cost, and the output driving circuit that is otherwise required in the prior art is eliminated and replaced with the code emitting circuit 14. The data code in the form of Manchester code is transmitted via air to the RF wireless receiving circuit 24 of the wireless siren 2, and is checked at the decoding and CPU circuit 22. When the received code is determined as correct, an anti-theft speaker is driven according to the content of the data code to emit sound. In this manner, the anti-theft device of the present invention may be installed without damaging the car structure, and the wireless siren 2 controlled by the host 1 can accurately analyze the data code within short time to precisely emit one, two, three, or four times of short sound at differently set intervals. The problem of incorrectly emitted sounds, such as one half short sound or one and a half short sound, can therefore be avoided. The present invention also effectively reduces interferences by or with other similar anti-theft devices to enable quick and accurate control of the anti-theft operation thereof.

In brief, the wireless anti-theft device has at least the following advantages:

1. The installation of it in a car would not damage the structure of the car.
2. It uses its CPU to encode the Manchester Code having a Hi-Low ratio of 1:1, and may therefore have a circuitry to be designed at largely reduced cost.
3. It enables accurate analysis of data code within very short time to minimize interference with or by other similar devices.

The present invention has been described with a preferred embodiment thereof and it is understood that many changes and modifications in the described embodiment can be carried out without departing from the scope and the spirit of the invention that is to be limited only by the appended claims.

What is claimed is:

1. A wireless anti-theft device, comprising:

a host having a power-supply voltage-stabilizing circuit for supplying power to different components of said host, an anti-theft coding and CPU circuit for generating data code in the form of Manchester anti-theft code having a Hi-Low ratio of 1:1, a host control circuit for controlling operations of different components of said host, an emitting circuit for emitting an anti-theft signal, a host receiving circuit for receiving a remote signal, and an input/output (I/O) socket for electrically connecting to a power receptacle on a car; and a wireless siren being internally provided with a power-supply voltage-stabilizing circuit for supplying power to different components of said wireless siren, an RF wireless receiving circuit for receiving an RF anti-theft signal from said host, a decoding and CPU circuit for decoding and comparing said anti-theft signal received by said RF wireless receiving circuit; and an anti-theft voicing and driving circuit for generating warning sound and anti-theft control;

whereby said wireless siren controlled by aid host is able to accurately analyze said data code within very short time, so that interference of said wireless anti-theft device with or by other similar devices is effectively reduced to enable quick and accurate control of anti-theft operations of said wireless anti-theft device.

2. The wireless anti-theft device as claimed in claim 1, wherein said Manchester anti-theft code generated by said anti-theft coding and CPU circuit in said host has an interval between two sets of codes shorter than 100 ms.

* * * * *